(12) United States Patent
Anderson

(10) Patent No.: US 6,846,422 B2
(45) Date of Patent: Jan. 25, 2005

(54) SLUDGE STRIPPING PROCESS AND SYSTEM

(75) Inventor: Paul W. Anderson, Long Beach, CA (US)

(73) Assignee: K2M Mobile Treatment Services, Inc., Long Beach, CA (US)

( * ) Notice: Subject to any disclaimer, the term of this patent is extended or adjusted under 35 U.S.C. 154(b) by 43 days.

(21) Appl. No.: 10/124,147

(22) Filed: Apr. 17, 2002

(65) Prior Publication Data

US 2003/0196969 A1 Oct. 23, 2003

(51) Int. Cl.[7] .............................................. B01D 11/00
(52) U.S. Cl. ........................ 210/773; 95/263; 95/265
(58) Field of Search .............................. 210/768, 769, 210/771, 773, 188, 173; 95/263, 265; 96/202

(56) References Cited

U.S. PATENT DOCUMENTS

| | | | |
|---|---|---|---|
| 2,151,079 A | 3/1939 | Bowen ............................ 210/2 |
| 3,577,341 A | 5/1971 | Keith, Jr. et al. ............. 210/53 |
| 3,677,405 A | 7/1972 | Keith, Jr. ...................... 210/71 |
| 3,692,668 A | * 9/1972 | McCoy et al. ............... 210/626 |
| 3,791,965 A | 2/1974 | Fitzsimons et al. ......... 208/179 |
| 3,899,419 A | 8/1975 | Emanuel ....................... 210/22 |
| 3,960,725 A | 6/1976 | Bjermo et al. ................. 210/67 |
| 3,994,804 A | 11/1976 | Kalvinskas ................... 210/27 |
| 4,245,396 A | 1/1981 | Maffet ........................... 34/12 |
| 4,260,489 A | 4/1981 | Greig et al. ................. 210/771 |
| 4,392,941 A | * 7/1983 | Roth et al. ..................... 208/13 |
| 4,512,878 A | 4/1985 | Reid et al. ................... 208/179 |
| 4,938,876 A | 7/1990 | Ohsol .......................... 210/708 |
| 4,985,131 A | 1/1991 | Lane ............................. 208/13 |
| 5,009,767 A | 4/1991 | Bartilucci et al. ............ 208/85 |
| 5,378,267 A | 1/1995 | Bros et al. ..................... 96/168 |
| 5,478,507 A | 12/1995 | Bros ....................... 261/114.1 |
| 5,545,330 A | 8/1996 | Ehrlich ........................ 210/703 |
| 5,575,921 A | 11/1996 | Askin et al. ................. 210/710 |
| 5,641,401 A | * 6/1997 | Stultz et al. ................. 210/218 |
| 5,994,597 A | 11/1999 | Bhatt et al. ................. 568/810 |
| 6,077,425 A | 6/2000 | Kleinschroth et al. ...... 210/184 |
| 6,110,385 A | 8/2000 | Copa et al. .................. 210/743 |

* cited by examiner

Primary Examiner—Robert James Popovics
(74) Attorney, Agent, or Firm—Myers Dawes Andras & Sherman LLP

(57) ABSTRACT

A method and system for removing volatile organic compounds (VOCs) from sludge advantageously utilizes a stripper for removing the VOCs directly from the sludge to convert the sludge into a non-hazardous material. Preliminary steps of mixing may include addition of a liquid to improve flowability. Then the sludge is moved through the stripper in which the VOCs are carried away in a gas provided in the stripper for the purpose of carrying the VOCs away. Any of a variety of strippers may be utilized for VOC removal. Subsequently, the liquid is separated from the sludge material in, for example, a dewaterer, and each of the liquid and the sludge is either recycled or dumped as a non-hazardous material or waste. The system may be configured in a variety of ways and still function properly in carrying out the method of the invention.

6 Claims, 5 Drawing Sheets

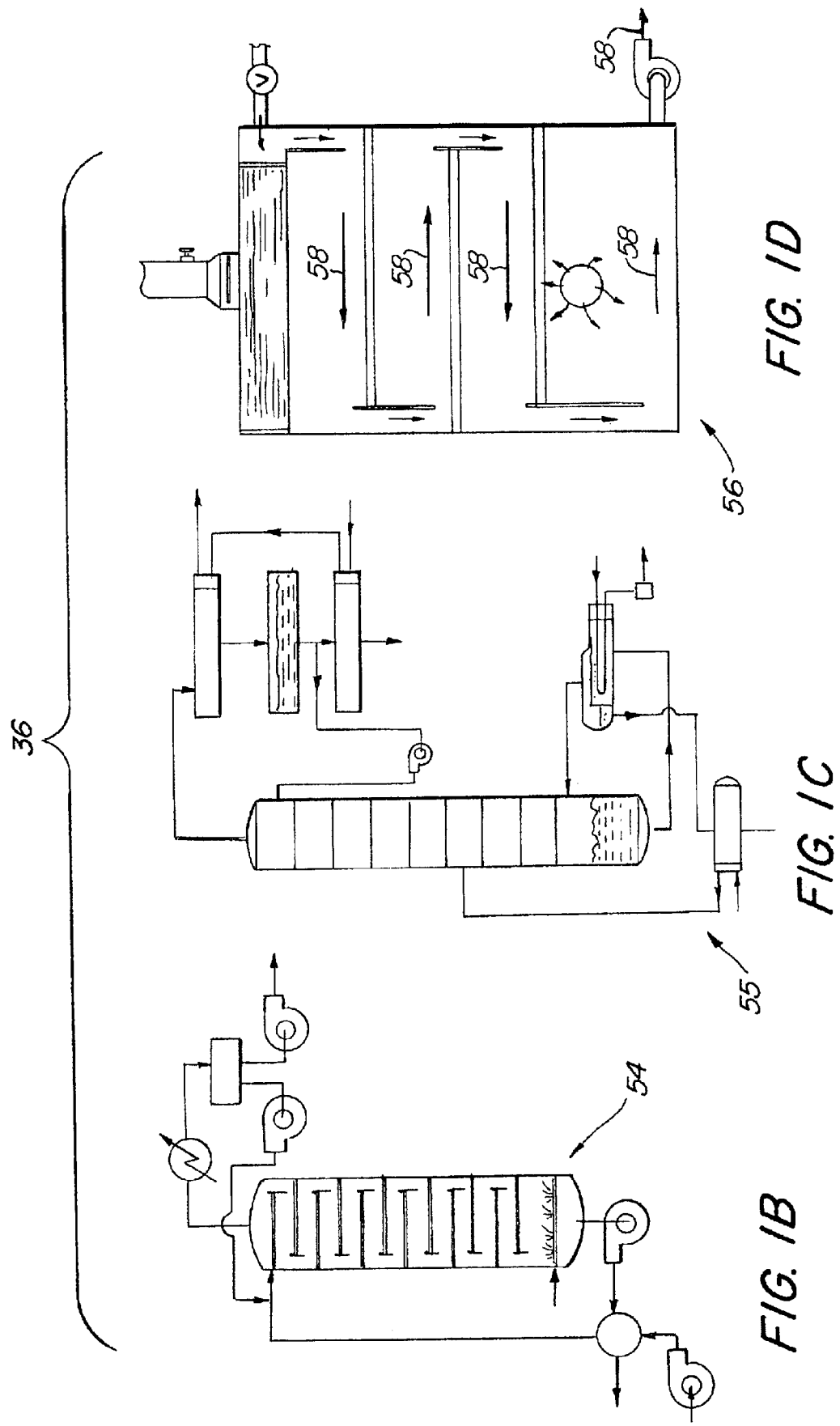

SLUDGE STRIPPING PROCESS AND SYSTEM

BACKGROUND OF THE INVENTION

1. Field of the Invention

This invention relates generally to the processing of sludges, and more specifically to apparatuses and methods for removing VOCs from sludges.

2. Description of the Prior Art

Sludge is a muddy mass, deposit, or sediment of precipitated solid matter often produced by water and sewage treatment processes. Sludge may have a range of water contents and is often semi-fluidic. Sludge may be removed from tanks, ponds, lagoons, sumps, and other wet environments. Petroleum and industrial sludges often contain VOCs that are deemed to be hazardous, such as benzene, for example. When benzene is present in high concentrations, the sludge containing this VOC is classified as a RCRA hazardous waste. That is, Federal Regulations restrict treatment and disposal of such a sludge.

Removing VOCs from sludge or solids has been accomplished in a flare system which is similar to a soil burner. In these processes, VOCs, (including benzene), are removed by heating or cooking the solids in order to volatilize the VOCs. In this way, the VOCs are released in the form of gases. However, this method is expensive because large amounts of energy are required to heat the sludge. Furthermore, this process is not permitted in some localities. Even in locations where such processing is permitted by local authorities, governmental restrictions often push the cost of processing sludge too high. Therefore, the sludge from a certain part of the country is often shipped to a site in another part of the country where the heating process is tolerated. In this case, the cost of handling the sludge includes the cost of transporting it. Overall, the past processes of treating sludges are slow, inconvenient, and costly.

Another portion of the prior art deals with removal of VOCs from waste water. In recent years, stripping, and in particular air stripping, has become a popular way to process waste water. The use of air stripping has been used with increased frequency because it is relatively inexpensive, and because of newly developed devices that are somewhat portable and adjustable. The lower cost of running these air strippers is due in part to the fact that air stripping does not require the energy of heating that is required in steam stripping or distilling. On the other hand, air stripping, (and stripping overall), has been deficient in providing stripping of solids or semi-solids.

Steam strippers of the past are often used to remove ammonia from waste water. Distillation stripping is typically used to remove oil from waste water that is being treated. Each of these processes require rather specialized equipment and a large amount of energy. Steam and distillation strippers are deficient in providing a simple and inexpensive means for removing VOCs.

Overall, the prior art is deficient in the field of sludge processing in that there is a lack of a processes that are economical and simple. Specifically, the prior art is deficient in providing low energy costs due to the conventional heating and/or cooking processes for sludge materials.

The prior art devices and methods incorporate large semi-permanent equipment structures for processing solids on site. The prior art are thus deficient in providing methods for processing sludge that will obviate the need to ship sludge over large distances at high costs. In other words, the prior art does not adequately provide processes and apparatuses that permit sludges to be processed either on site or at nearby locations in order to remove VOCs from the sludge at lower costs.

The inadequacies of the prior art include the fact that the conventional methods for removing VOCs from sludge are very limited. There is a real deficiency in directly or indirectly removing VOCs in order to convert the sludge from a hazardous waste to a non-hazardous material or waste so that the sludge may be disposed of in areas of the country where disposal is not otherwise permitted.

Prior art methods for solids and sludge lack the greater efficiency associated with processing fluids as they move along a flow path. Furthermore, the prior art is deficient in providing a means for volatilizing solids as they move along a path during processing.

The prior art sytems for processing water are deficient for processing sludge because the prior art devices depend on flow of the substance being processed in the systems. In other words, there is a real lack of devices that can properly handle higher viscosity substances such as sludge. There is a related deficiency of pumps that are capable of pumping a substance that has a large percentage of solids. The prior art is also deficient in providing the system to include any preliminary steps to improve the subsequent conventional VOC removal from solids or sludges.

SUMMARY OF THE INVENTION

The process and system of the instant invention overcomes these deficiencies. In one aspect of the invention, it has been discovered that although it seems counterintuitive to add water or another liquid to the sludge as a preliminary step, VOCs can be removed in a simple and less expensive way by doing so. Adding water is counterintuitive in light of the prior art since all of the prior art has taught heating or cooking sludges in order to raise their temperature and volatilize the VOCs. Heating or cooking tends to remove water by increased evaporation. This is directly opposite to adding water, as is done in the instant invention.

Additionally, in the heating or cooking methods of the prior art, VOCs are removed from the sludge in the form of gases. Adding water, therefore, seems counterintuitive since it does not directly remove gasses or volatilize the VOCs. It would appear that adding water would simply increase the volume of material that needs to be processed and ultimately add to the required work of dewatering the sludge in the end. However, water is added in order to make the sludge more flowable, which helps to overcome one of the deficiencies of the prior art.

Furthermore, it is also counterintuitive to process sludge in chambers that were, in their original form, physically configured to be used for waste water. Doing so is counterintuitive because it would seem that such strippers would quickly become clogged and cease to function properly with the solids that are present in sludge material.

The instant invention includes these counterintuitive steps to provide a new method and system for removing VOCs from sludge. Initially, the sludge is mixed in mixing tanks, which can be conventional mixing tanks. Mixing the sludge alone, or adding water or another liquid, is performed in order to provide a more homogenous and flowable slurry mixture with a lower viscosity than the original sludge. The next step of the process is to filter the sludge in filters to remove larger sized material. The object of removing the solids is to take them out of the sludge before the sludge is processed in the following step of stripping. Following removal of the larger solids in the filtering step, the sludge enters the sludge stripper for removal of the VOCs. The stripper utilized for removing the VOCs may be an air stripper, a steam stripper, a distillation tower, distiller, or a stripper of any other similar treatment technology. These strippers remove VOCs by volatizing the sludge and carrying away the VOCs in gas vapors from the sludge.

The VOC bearing vapor is either discharged to the environment or to a vapor control device. The removal of the VOCs from the sludge enables sludge leaving the stripper to have VOCs at low enough levels that the sludge is not considered hazardous waste. Thus, another deficiency of the prior art is overcome. Chemicals may be added to the sludge downstream of the sludge stripper. The next step of the process is sludge dewatering. The dewatering step may be accomplished in a centrifuge, filter press, belt press, dryer, or a similar dewatering device or system. The liquids removed from the sludge during the dewatering step may include waste water including petroleum products. The waste water and petroleum product liquid is further processed or discharged into the environment. The solid components from the sludge dewatering step are then either recycled or disposed of in the environment. Chemicals and materials such as polymers, acids, caustic, bentonite, barite, or others may be added to the sludge before and/or after the dewatering process.

This new method and system for processing sludge further overcomes the deficiencies of the prior art in that it saves energy and the expense of either processing or shipping sludge to a site where it is processed. Utilizing the method and system of the instant invention, for example, cuts costs at least in half.

The individual elements utilized in the system of the above method may each be conventional. However modification of at least one of the elements is called for because of the exigencies of processing sludge as opposed to waste water. In particular, the sludge stripper is generally modified to properly accommodate the sludge material. As such, another deficiency of the prior art is overcome. That is, the new method and system accommodates solids moving along a path and being processed as they move.

Even though many of the individual elements of the system are conventional, the combined system of elements is unique. That is, the combination of the elements of the instant invention has previously never been made. Furthermore, the sludge stripper may never have been combined with any of the other elements of the system prior to the instant invention. This is so because it was not known that strippers could be utilized for stripping VOCs from sludge.

Preferably, the stripper utilized is a variable-height, collimated air stripper. This air stripper has a variable number of trays in a vertical array or stacked configuration. The sludge is fed or pumped into an upper portion of the stripper. This sludge has been brought to a viscosity at which it flows. As such, the sludge flows into a top tray, along a bottom of the top tray in a first direction, over a weir, into a second tray, across a bottom of the second tray in a second direction, over a weir, and so forth until it reaches a sump in the lower portion of the air stripper. While the sludge is moving back and forth across the stripper in respective trays, air, or some other non-volatile gas, is being pumped upwardly through apertures in the bottom of each of the trays. In order to achieve this, the air is forced into an upper portion of the sump by pressure produced by a pump or a blower. The air travels up through the apertures in the bottoms of the trays and through the sludge in each tray until it reaches a cover above the series of collimated trays. In the cover the air passes through a demister mesh to remove excess water from the vapor. Then the vapor moves upwardly, out of an exhaust stack, and carries away the VOCs that were picked up as the air passed through the sludge. In this way another deficiency of the prior art is overcome in that the VOCs in the sludge are carried away directly from the solids in the sludge. The next step of the process is for the sludge to either receive additive chemicals or to be dewatered.

By the time the sludge reaches the sump, the VOCs have been reduced considerably. This is of particularly of interest when a level of benzene has been measured or detected in the sludge, which places the sludge in a category of hazardous material or waste. In such cases of high levels of benzene, the air stripper removes sufficient benzene and other VOCs from the sludge so that the sludge is no longer a hazardous material or waste. Then the sludge is pumped from the sump to the next step of the process, in which the sludge either receives additive chemicals or is dewatered.

By passing the air through the sludge to remove the VOCs, another deficiency of the prior art is overcome in that the VOCs are removed without the expenditure of large amounts of energy to heat the sludge.

Although the air stripper used in the system of the instant invention requires more frequent maintenance and cleaning when utilized for air stripping sludge, details of the instant invention facilitate doing so. In any case, the additional maintenance and cleaning required has proven to be manageable. This is especially so due to the fact that the air stripper is portable, adjustable in height, and can be easily broken down into its parts. As such, the device remains simple, inexpensive, and can easily be taken to almost any treatment site. Therefore, others of the prior art deficiencies are overcome.

These and other features and advantages of the invention will be better understood with a discussion of preferred embodiments and reference to the associated drawings.

DESCRIPTION OF THE DRAWINGS

FIG. 1B is a schematic section view of a steam stripper;

FIG. 1C is a schematic section view of a distillation tower;

FIG. 1D is a schematic section view of an air stripper;

DESCRIPTION OF THE PREFERRED EMBODIMENTS AND BEST MODE OF THE INVENTION

Figure 1A:
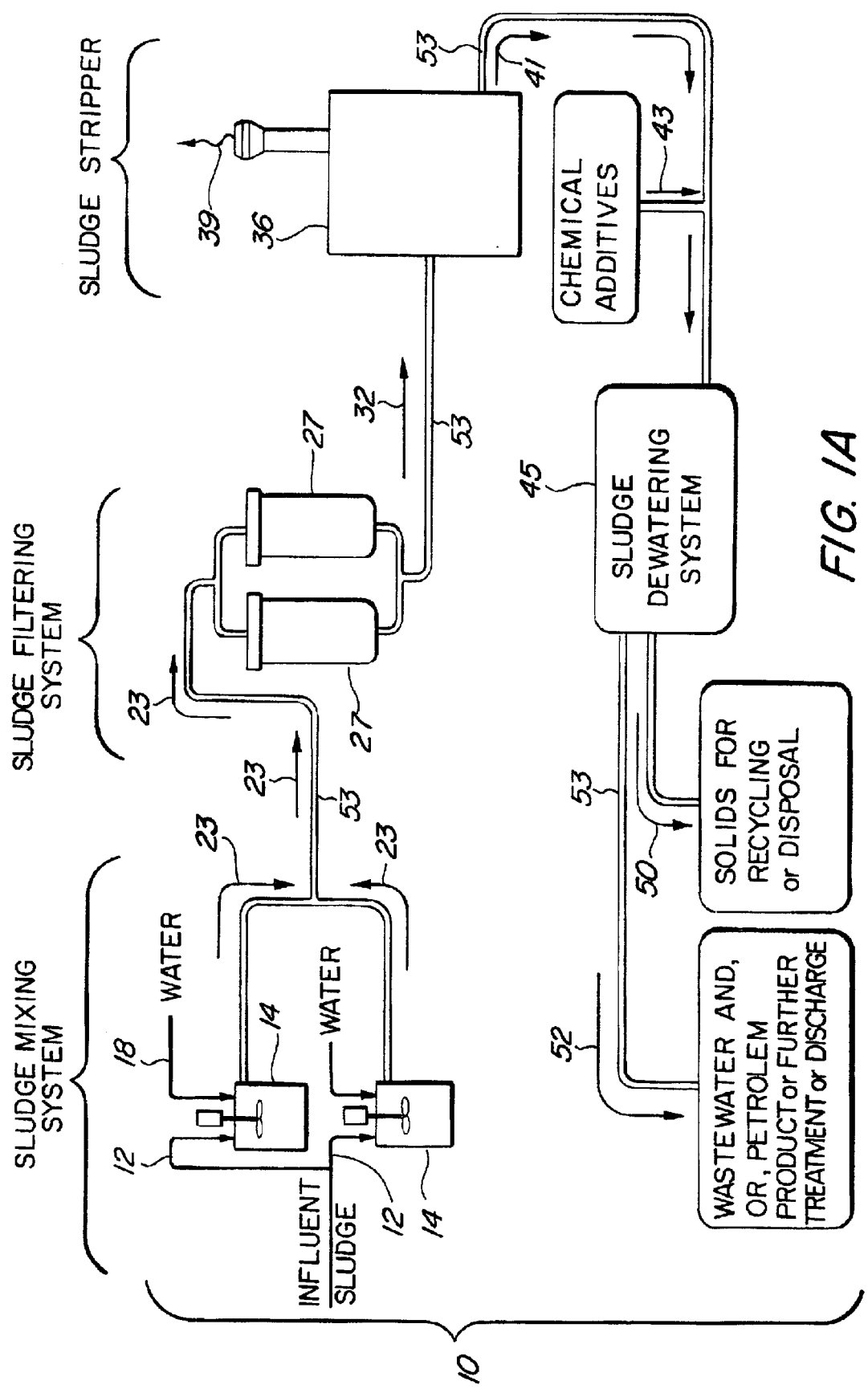
FIG. 1A is a diagram showing the sludge processing system and the process for removing VOCs from the sludge as indicated by the flow arrows of the sludge through the system.

As shown in FIG. 1 the sludge processing system 10 receives influent sludge 12 into mixing tanks 14 as shown by arrows. Water 18 may be added as needed in order to provide a more homogenous mixture having lower viscosity and greater flowability. Mixed sludge 23 leaves the mixing tanks 14 and enters sludge filters 27. Filtered sludge 32 leaves the filters 27 and enters the sludge stripper 36. Here the VOCs are removed in the form of VOC vapor 39. The devolatilized sludge 41 leaves the stripper 36 and either receives at least one chemical additive 43 or simply enters the sludge dewaterer 45. As shown, devolatilized solids 50 and liquids 52 leave the dewaterer. It is to be understood that the sludge 12, 23, 32, 41 is carried in conventional conduits 53 between the elements of the system.

Prior to implementing the method, sludges are tested to determine whether and to what extent VOCs need to be removed there from. When the sludge 12 has been determined to have high levels of VOCs including the hazardous volatile compound, benzene, for example, the process of the instant invention may be utilized to remove the VOCs including benzene. As a first step of the process the sludge is placed in mixing tanks 14. A typical percentage of solid to liquid in the influent sludge 12 is approximately 50% solid and 50% liquid. In the mixing tank 14, the sludge is blended. Water may be added to provide a more homogenous and a lower viscosity sludge. Sludge 12 and water or another nonvolatile liquid are mixed or circulated for a short period of time. When the mixed sludge 23 is ready to leave the mixer tanks, the mixture may comprise 25% solids.

The mixing step of the process serves several functions. Specifically, it causes the sludge mixture 23 to be more homogenous and flowable. As such, the mixture is more pumpable. Generally, the mixing process particalizes the solids, thus making them smaller for better contact with the stripping agent that they will encounter downstream.

In the next step of the process, larger solids are removed from the sludge 23 by sludge filters 27 in order to avoid their entry into the sludge stripper 36. The sludge filters 27 may be configured based on the characteristics of the particular sludge 12, 23 being processed. In particular, the size of the filtration may be selected based on the size and number of large solids present in the sludge 12, 23.

While removing solids from the sludge may seem to defeat the purpose of reducing VOCs from at least those solids being filtered out, filtered out solids generally account for only a small portion of the total solids in the sludge. For example, twelve 55-gallon drums would typically be removed in the filtration step of the process from a total of 300,000 gallons of sludge. That equates to an average of slightly less than a pint of large solids taken from each 55-gallon drum. Therefore, the volume of hazardous material or waste not treated is very small.

The next step of the process is carried out in a stripper 36. Three varieties of strippers are shown in FIGS. 1B, 1C, and 1D respectively. A first variety is a steam stripper 54 as shown in FIG. 1B. A second variety is a distillation tower 55 as shown in FIG. 1C. A third variety, and the stripper of choice in the preferred embodiment, is an air stripper 56 as shown in FIG. 1D.

Figure 2A:
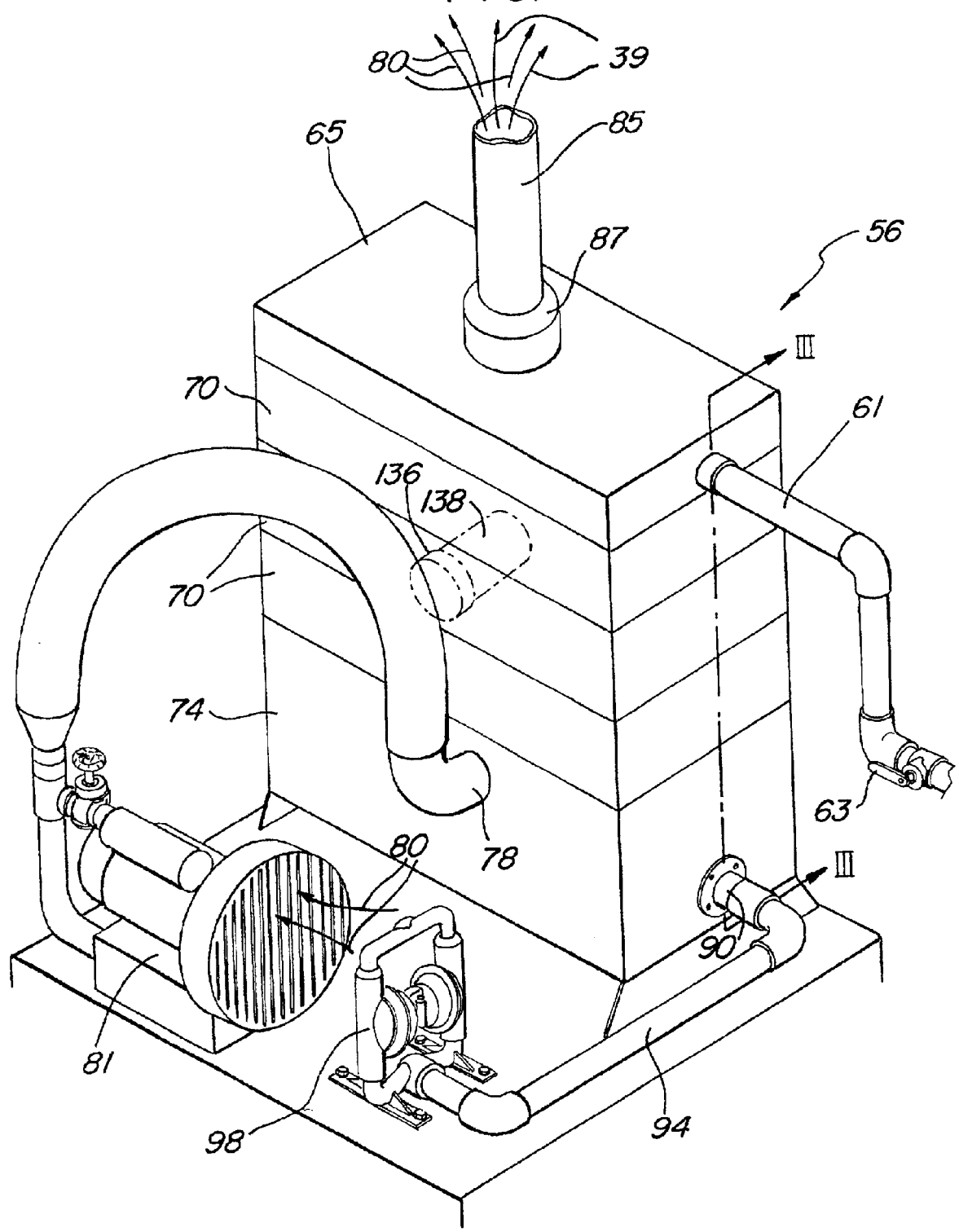
FIG. 2A is a perspective view of an air stripper utilized in the system of the preferred embodiment.

The stripping is carried out in the air stripper 56 shown in FIGS. 1D and 2A. Air stripper 56 defines a flow path 58 through which the sludge 32, 41 is guided by the physical aspects of the stripper 56 as described below. The sludge 32 enters the air stripper 56 through sludge inlet 61. A valve 63 controls flow of the sludge 32 into the air stripper 56. The sludge inlet 61 directs the sludge 32 into a cover 65. The cover 65 directs the sludge 32 into an upper tray 70. The sludge 32 moves along upper tray 70 and into a substantially similar next subjacent tray 70. Trays 70 are generally identical, and the number of vertically stacked trays 70 may be selectively varied by the user. After the sludge 32 moves across a lowermost tray 70, it enters a sump 74. At this point, the sludge 32 has been converted into a devolatilized sludge 41. It should be noted that devolatilized sludge 41 is a relative term, and that the VOCs need only be reduced to a point at which the sludge 41 is no longer considered a hazardous material or waste.

Also entering the sump through an air inlet 78, is air 80 or some other nonvolatile gas. This air 80, or some other gas, is forced into the air stripper 56 by a blower or an air pump 81. An air pipe or conduit 83 drives the air 80 from the blower 81 and into the sump via the air inlet 78.

The air 80 moves upwardly through the trays 70 in a manner to be described further below. After the air 80 has passed through the trays 70 it is expelled through the exhaust stack 85 carrying VOC vapor 39 up from the sludge 32 in the trays 70. Before passing upwardly through the exhaust stack 85, the air 80 and VOC vapor 39 pass through a demister chamber 87 in order to remove excess water from the air 80 and vapor 39.

The devolatilized sludge 41 exits the air stripper 56 via the sludge outlet 90 in a lower portion of the sump 74. The devolatilized sludge 41 moves through the sludge outlet 90 and into outlet conduit 94 and is pumped by a sludge pump 98. Sludge pump 98 is preferably an air diaphragm pump that is used for solids such as those found in sludge in general. Any of a variety of pumps adapted for pumping solids may be alternatively employed and take the place of pump 98. However, adding such a pump is considered an upgrade from combinations that are generally used in simple water purification methods since pumps that handle solids are more expensive than those that are adapted for water only.

Figure 2B:
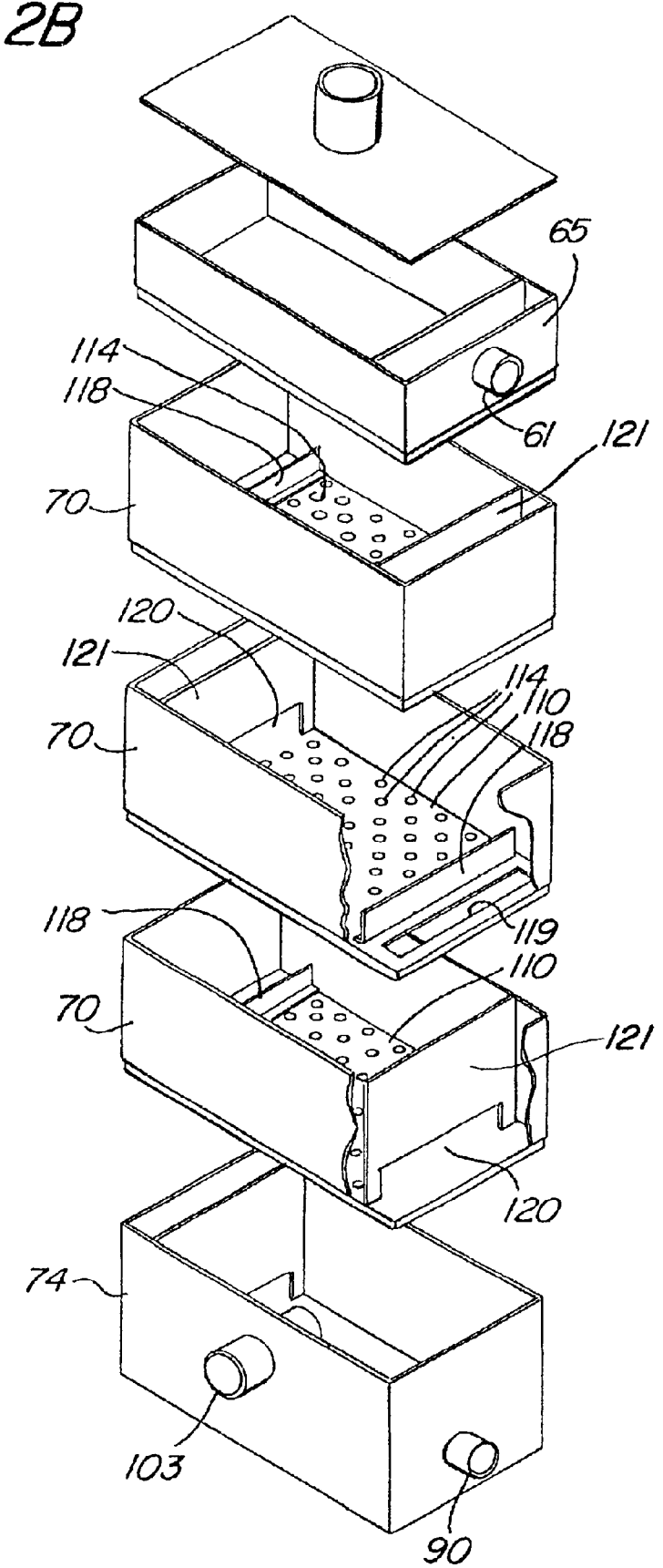
FIG. 2B is an exploded view of the air stripper utilized in the preferred embodiment of the instant invention.

In the exploded view of FIG. 2B, an air inlet flange 103 protrudes from the sump 74. As can be seen in FIG. 2B, the air inlet flange 103 guides air 80 into the sump 74. Also shown in FIG. 2B is the bottom 110 of the trays. These bottoms 110 have apertures 114 through which the air 80 is forced during stripping. Weirs 118 are located near a downstream end of each respective tray 70. Slightly downstream of the weir 118 is a tray outlet 119. The sludge 32 passes over the top of weir 118, down through tray outlet 119, and into the next subjacent tray 70. In the next subjacent tray 70, and in each of the trays 70, the sludge 32 passes through a tray inlet 120 in an inlet wall 121 of the tray 70.

Figure 3:
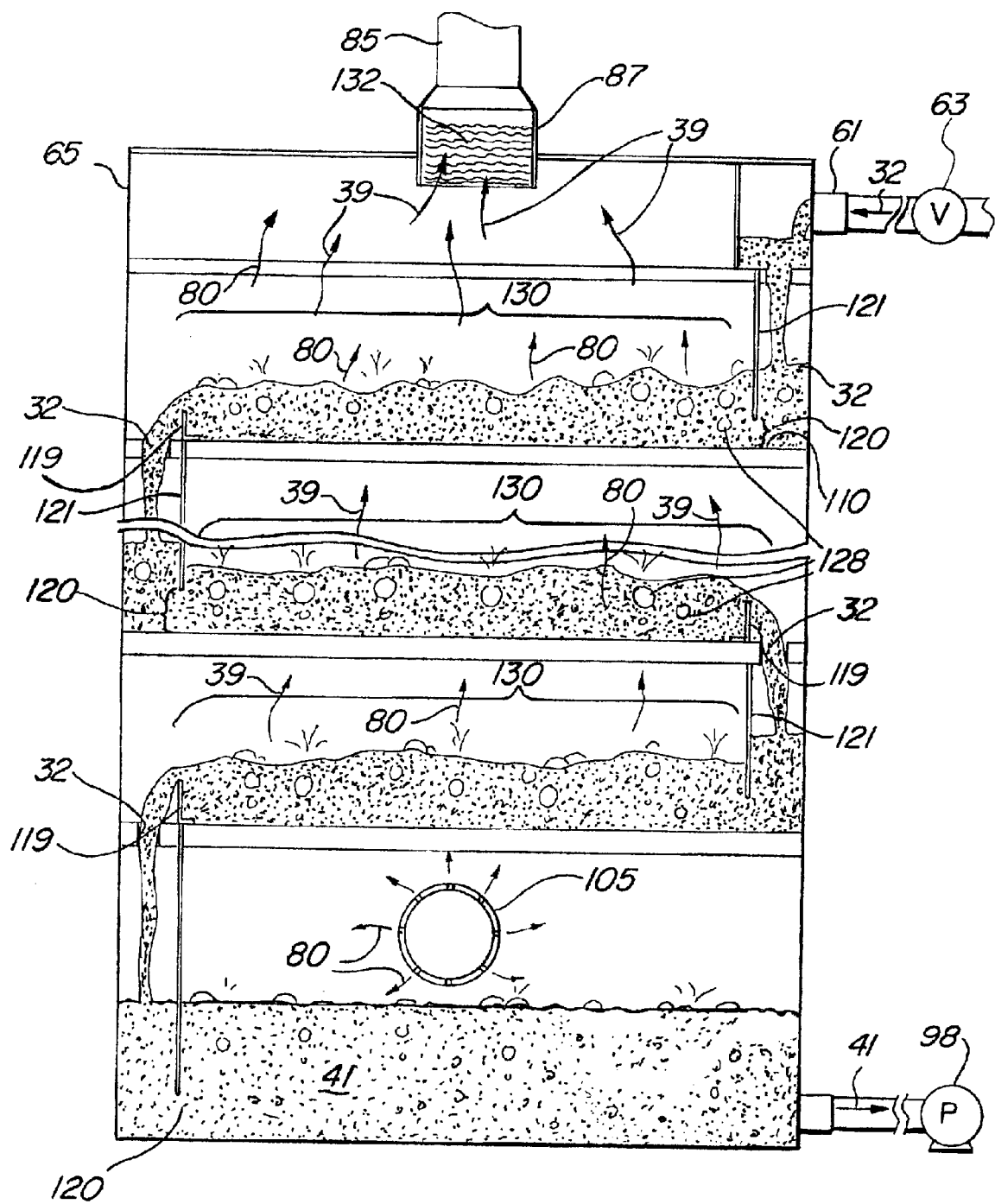
FIG. 3 is a cross-sectional view of the air stripper taken along lines 3—3 of FIG. 2A.

FIG. 3 clearly shows how the air 80 or other gas is forced out of the manifold and up through the trays 70. The air 80 or other gas moves through the sludge 32 in the form of bubbles, and collects and carries with it VOCs from the sludge. As can be seen in the cross-sectional view of FIG. 3, the air 80 moves upwardly through the sludge across an entire treatment area 130 of each tray. FIG. 3 also shows a demister 132 that is located in a demister chamber 87 of the exhaust stack 85.

In the preferred embodiment, inlets 120 do not have gasket material that acts as a one way flow means. Such gaskets have generally been beneficial for tray inlets 120 of air strippers that are used for waste water. These gaskets can be removed from strippers that were intended for waste water treatment so that the gaskets do not aggravate clogging of the solids present in the sludge 32 when implementing the instant invention. Generally, clogging will occur at a tray inlet 120 or at a tray outlet 119. This is due to the fact that the inlet 120 and the outlet 119 form restrictions in the flow path 58 that have a tendency to hold back larger solids and cause clogging. This is true even without the gasket material associated with the inlet as set forth above.

Thus, the air stripper 56 of the instant invention may be equipped with viewing and cleaning ports 136 having access caps 138. These ports 136 and associated caps 138 are optionally, yet preferably, located near ends of the respective trays 70 to enable viewing and cleaning access to the ends of the trays where clogging is more likely to occur as set forth above. In use, the cleaning ports 136 can be opened via port caps 138 periodically to view conditions within the stripper. The cleaning ports 136/138 can also be opened for cleaning access to remove solids that have clogged the trays 70. This can advantageously reduce down time that is otherwise required in order to take the trays 70 apart for cleaning. Typically, the clogging occurs in an uppermost tray 70 or in a lowermost tray 70. As such, the stripper 56 can be supplied with trays 70 that have ports 136 in at least the uppermost and the lowermost trays 70.

While the invention has been described in terms of a specific air stripper 56, it should be understood that any of a number of strippers including air strippers, steam strippers or distillers may be used to strip VOCs from sludge. Furthermore, it should be understood that the specific configuration of a given stripper may be changed without departing from the spirit and scope of the instant invention. For example, the air stripper of the preferred embodiment incorporates a column of trays. This is advantageous because a single flow of air 80 may be passed upwardly through a plurality of trays 70 without any re-routing. However, the air stripper may be embodied by a series of trays that are in series along a generally horizontal direction. It is contemplated that any one of a number of configurations of stripper integrated into the system may be within the spirit and scope of the instant invention.

Once the devolatilized sludge 41 leaves the sludge stripper 36/56, chemical additives 43 can be added. Then the devolatilized sludge 41 enters the sludge dewatering system 45. Here, waste water and/or other petroleum products constituting the liquid portion 52 of the products of the sludge dewatering system are separated from the solids in the devolatilized sludge 41. The liquids 52 may be further treated or discharged to the environment depending on their content. After liquids 52 have been removed from the sludge 41, the solids 50 may be recycled or disposed of also. Solids 50 of the sludge 41 that have been dewatered now have reduced VOCs. Reduced VOCs in sludge 41 that originally contained hazardous volatile compound, benzene, for example, means that the benzene content of the sludge is also lower. Lowering the benzene in this way permits the solids 50 to be disposed of without causing harm to the environment, and causes the sludge 41 to no longer be a hazardous material or waste for regulatory purposes.

The invention has been discussed with particularity in reference to the figures and other alternatives. However, it is to be explicitly understood that there are a wide variety of variations of the invention not specifically disclosed herein, but which fall within the spirit and scope of the invention. Hence, the scope of the invention is to be limited only in accordance with the claims that follow.

I claim:

1. A method for processing sludge containing solids with volatile organic compounds, the sludge having a first viscosity, the method comprising the steps of:
   (A) mixing the sludge with a liquid to produce a sludge mixture that is generally homogenous and has a second viscosity lower than the first viscosity;
   (B) moving the sludge mixture through a stripper;
      (i) during the moving step, volatizing the organic compounds present in the sludge mixture to remove the volatile organic compounds from the sludge mixture and to produce a less hazardous mixture;
      (ii) separating the less hazardous mixture generally into liquids and non-hazardous solids; and
   (C) disposing of the non-hazardous solids.

2. The method of claim 1, further comprising the step of filtering from the sludge mixture solids having size greater than a predetermined size.

3. The method of claim 1, further comprising the steps of:
   removing volatile organic compounds from the sludge mixture by aerating.

4. The method of claim 1, comprising the step of removing the volatile organic compounds from the sludge mixture by at least one of distilling, steaming, and aerating the sludge mixture.

5. The method of claim 3, wherein the step of removing includes the steps of:
   during the aerating step moving the sludge mixture along a plurality of trays; and
   during the moving step, passing air upwardly through the sludge mixture in at least one of the trays to remove at least a portion of the volatile organic compounds from the sludge mixture.

6. The method of claim 3, further comprising, prior to the removing step, filtering the sludge mixture to withdraw at least a portion of the solids from the sludge mixture.

* * * * *